J. C. BAKER.
Grain-Drills.
No. 150,511. Patented May 5, 1874.
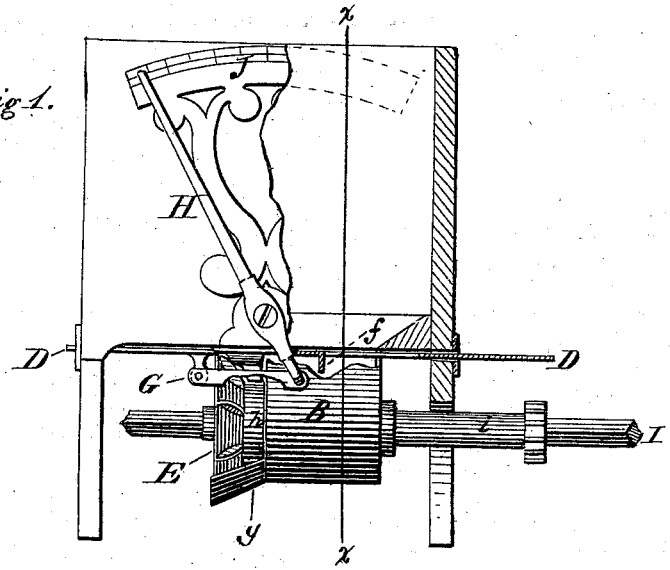
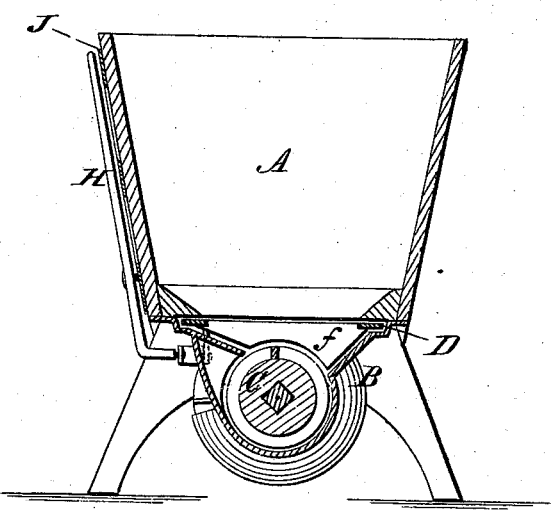
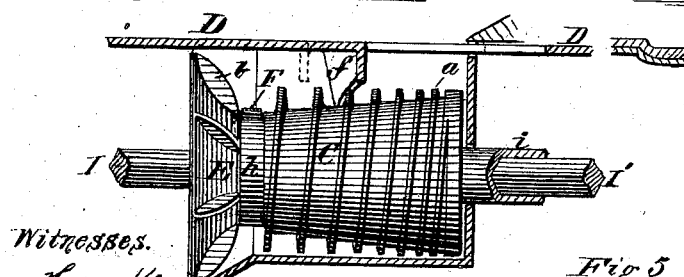
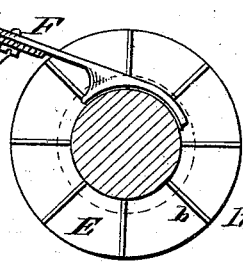
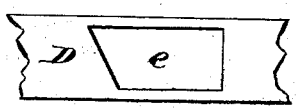
Witnesses.
Harry King
W. H. Dodge
Inventor.
John C. Baker
By Dodge & Son
Attys.

UNITED STATES PATENT OFFICE.

JOHN C. BAKER, OF MECHANICSBURG, OHIO.

IMPROVEMENT IN GRAIN-DRILLS.

Specification forming part of Letters Patent No. 150,511, dated May 5, 1874; application filed January 31, 1874.

*To all whom it may concern:*

Be it known that I, JOHN C. BAKER, of Mechanicsburg, in the county of Champaign and State of Ohio, have invented certain Improvements in Feeding-Mechanism for Grain-Drills, of which the following is a specification:

My invention consists in the combination of a spirally-threaded feed-roll, mounted in a cylindrical cup, with a distributing-wheel on the end of the roll; in a latch of novel construction and arrangement to hold the roll in place; and in other details of construction hereinafter explained.

Figure 1 is a side elevation of my feeding apparatus in position on a hopper, the side of the latter being partially broken away; Fig. 2, a transverse vertical section on the line $x\,x$ of Fig. 1; Fig. 3, a longitudinal section through the feed-cup and the regulating-slide with the feed-roll in position; Fig. 4, a transverse vertical section on the line $y\,y$ of Fig. 1, showing the latch by which the feed-roll is held in place; Fig. 5, a top-plan view of the slide by which the feed is regulated.

A represents an ordinary feed-hopper; B, the feed-cup, secured to the hopper; C, the feed-roll mounted in the cup; D, a slide under the bottom of the hopper above the roll and cup for the purpose of controlling the feed; and E, the distributing-wheel on the end of the feed-roll. The feed-roll is made of a cylindrical or slightly-tapering form, and is provided around its exterior with a spiral or screw thread, $a$, the spaces between which increase gradually in width and depth toward the discharge end of the roll, as shown in Fig. 3. The feed-cup B, in which the roll is mounted, fits closely around the latter, except at the top, where it flares outward to receive the seed which rests directly on the top of the roll. The cup has its upper flaring sides secured to the bottom of the hopper A by screws or bolts, as shown. At one end the feed-cup is closed up around the roll, but at the other end it is left open to permit the escape of the seed, as shown in Fig. 3. The roll is made with an opening longitudinally through its center to receive the supporting and driving shaft I, and is provided at one end with a hollow hub or sleeve, $i$, which fits through the closed end of the cup, and assists in steadying and supporting the feed-roll. Between the bottom of the hopper and the top of the feed the slide D is mounted, for the purpose of covering more or less of the feed-roll, and thereby changing the rate of feed without changing the speed at which the roll revolves. The slide is made with an opening, $e$, through which the seed passes to the roll. This opening has that side which is nearest the discharge end of the feed-roll made oblique or inclined, as shown in Fig. 5, and provided on the under side along the inclined side of the opening with a flange or lip, $f$, which fits down closely around the upper side of the roll. The side of the opening and its flange $f$ are inclined in the opposite direction from the screw-threads on the roll, so that in looking down from the above the flange $f$ stands obliquely across the threads. By moving the slide endwise, any desired portion of the opening $e$ may be brought over the roll; or, in other words, any desired portion of the roll's length covered by the solid portion of the slide, and thus the amount of surface exposed to the seed increased or diminished at will. When a large surface is exposed the roll feeds rapidly, but as the surface is diminished the feed is reduced correspondingly. On the discharge end of the feed-roll I secure a distributing-wheel, E, which is made of larger diameter than the roll, and arranged to fit closely within a flaring mouth, $m$, formed on the end of the feed-cup, as shown in Figs. 1, 2, and 3. The outer side or face of this distributing-wheel is made flat and of such diameter that it fills the outer end of the flaring mouth, and prevents the escape of grain at the end. The inside face of the wheel is hollowed out or concaved from the outer edge inward to the end of the feed-roll, and is provided with ribs or teeth $b$ to feed the grain out. The flaring mouth is cut away on one side down to a point a little below the level of the center shaft, so as to leave a discharge-opening, as shown in Figs. 1 and 2. In order to hold the roll in place in the cup and prevent it from moving endwise therein, it is provided with a circumferential groove, $h$, next to the distributing-wheel, and a latch or yoke, F, is secured to the cup, and has its end shaped and arranged to fit into said groove, as shown in Figs. 1, 3, and 4. The upper end of this latch extends up inside of the feed-cup, and bends down through a slot in the same, as shown in Fig. 4, and it is held down, and its lower end kept in the groove by means of a screw, o, which is passed through the side of the cup and up into the latch, as also shown in Fig. 4. By loosening the screw o, the latch is released, so that its lower end may be raised out of the groove, and the roller thereby left free to slide out of the feed-cup. The slide D is moved by means of a hand-lever, H, which is pivoted on the side of the hopper and connected at its lower end by means of a link, G, to a stud on the slide, as shown in Figs. 1 and 2. The hopper is provided, under the upper end of the hand-lever, with a plate, J, having graduations to indicate the rate of feed when the lever is set opposite to them.

When the machine is in operation, the seed passing down through the opening e in the slide D comes in contact with the threads of the feed-roll, which carry it out into the flaring mouth of the cup, where it is caught by the lips b of the distributing wheel E and fed out evenly and steadily through the discharge-opening in the side.

By means of the combined screw-feed and distributer, I produce a very steady and regular discharge. By moving the slide I can increase or diminish the discharge instantly while the machine is in motion, and without changing the speed of either the feed-roll or distributing-wheel.

The coarse threads on the roll are adapted for feeding corn, oats, beans, peas, &c., while the narrower threads are adapted for wheat, rye, buckwheat, and other small grains, so that by moving the slide and exposing the proper portions of the roll, the machine may be adjusted for feeding all kinds of grain and seed.

In case gravel or any other obstruction enters the feeding mechanism, it is only necessary to release the latch, when the roll and wheel may be moved along on the shaft out of the feed-cup, the obstruction removed, and the parts again replaced.

It is obvious that the feed-roll may have its threads made of uniform size, that the distributing wheel and cup may be varied in form, that the opening e in the slide may be of a different shape, and that the latch may be fastened by a thumb-screw or other device which can be released by the operator's fingers without the employment of any tool or instrument.

Having thus described my invention, what I claim is—

1. In combination with a spirally-threaded feed-roll, C, a distributing-wheel, E, constructed and arranged substantially as described.

2. In combination with the cylindrical feed-cup B, having the flaring mouth m, the feed-roll C and distributing-wheel E, constructed and arranged as shown.

3. In combination with the feed-roll C, the latch F, constructed and arranged substantially as shown, for the purpose of holding the roll in place.

4. In combination with the screw feed-roll C and the cup B, the flat slide D, mounted above the roll and provided with the opening e and depending flange f, as shown and described.

JOHN C. BAKER.

Witnesses:
  THOMAS MORGAN,
  GEO. W. BUFFINGTON.